(12) United States Patent
Chen et al.

(10) Patent No.: US 9,009,691 B1
(45) Date of Patent: Apr. 14, 2015

(54) USING AN INLINE STACK TO IMPROVE PERFORMANCE OF AN APPLICATIONS BINARY

(71) Applicant: Google Inc., Mountain View, CA (US)

(72) Inventors: Dehao Chen, Mountain View, CA (US); Xinliang David Li, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/940,987

(22) Filed: Jul. 12, 2013

(51) Int. Cl.
*G06F 9/45* (2006.01)

(52) U.S. Cl.
CPC .................. *G06F 8/4443* (2013.01)

(58) Field of Classification Search
USPC .................. 717/140–142, 150–152
IPC .............. G06F 11/362,11/3636, 11/3628
See application file for complete search history.

(56) References Cited

U.S. PATENT DOCUMENTS

| | | | |
|---|---|---|---|
| 6,195,793 B1 * | 2/2001 | Schmidt | 717/151 |
| 6,240,548 B1 * | 5/2001 | Holzle et al. | 717/140 |
| 6,505,344 B1 * | 1/2003 | Blais et al. | 717/151 |
| 7,200,841 B2 * | 4/2007 | Lovett et al. | 717/151 |
| 7,290,253 B1 * | 10/2007 | Agesen | 717/154 |
| 7,302,679 B2 * | 11/2007 | Chakrabarti et al. | 717/144 |
| 7,386,686 B2 * | 6/2008 | Wu et al. | 711/147 |
| 7,716,652 B2 * | 5/2010 | Smith et al. | 717/130 |
| 7,873,943 B2 * | 1/2011 | Wu et al. | 717/114 |
| 7,996,825 B2 * | 8/2011 | Chakrabarti et al. | 717/140 |
| 8,349,499 B2 * | 1/2013 | Oh et al. | 429/326 |
| 8,370,821 B2 * | 2/2013 | Haber et al. | 717/151 |
| 8,423,980 B1 * | 4/2013 | Ramasamy et al. | 717/140 |
| 8,549,499 B1 * | 10/2013 | Ding et al. | 717/149 |
| 8,788,569 B2 * | 7/2014 | Griffiths et al. | 709/202 |

OTHER PUBLICATIONS

Shi et al,"Virtual Machine Showdown: Stack Versus Registers", ACMTransactions onArchitecture andCode Optimization, vol. 4, No. 4, Article 21, pp. 1-36, 2008.*
Vitali et al, "Benchmarking Memory Management Capabilities within ROOT-Sim", IEEE, pp. 33-40, 2009.*
Kim et al, "Code-based Cache Partitioning for Improving Hardware Cache Performance" ACM, pp. 1-5, 2012.*
Regehr et al, "Eliminating Stack Overflow by Abstract Interpretation", ACM Transactions on Embedded Computing Systems, vol. 4, No. 4, pp. 751-778, 2005.*

* cited by examiner

*Primary Examiner* — Anil Khatri
(74) *Attorney, Agent, or Firm* — Birch, Stewart, Kolasch & Birch, LLP

(57) ABSTRACT

A system and method for using inline stacks to improve the performance of application binaries is included. While executing a first application binary, profile data may be collected about the application that includes which callee functions are called from the application's callsites and the number of times each inline stack is executed. A context summary map may be created from the collected profile data which shows a summary of the total execution count of all instructions in the callee function for each callsite inlined in the application's normal binary. Using the context summary map, each function callsite's execution count may be compared with a predetermined threshold to determine if the function should be inlined. Then the application's profile may be annotated and a second application binary, an optimized binary, may be generated using the annotated profile.

12 Claims, 5 Drawing Sheets

{
[POS1, POS3]: 10
[POS2]: 73
[POS1, POS4, POS5]: 1
[POS1, POS4, POS6]: 2
[POS1, POS4, POS7]: 1
[POS1, POS10, POS11]: 100
[POS1, POS10, POS12]: 150
[POS13, POS14]: 80
[POS13, POS15]: 90
[POS16, POS11]: 25
[POS16, POS12]: 37
}

FIG. 2b

{
[POS1, POS3]: 10
[POS1, POS4]: 4
[POS1, POS10]: 250
[POS1]: 264
[POS2]: 73
[POS13]: 170
[POS16]: 62
}

FIG. 2c

Function foo () {
  POS 1: call bar()
  POS 2: instruction 1
  POS 13: call baz()
  POS 16: call hey()
}

Function bar() {
  POS 3: instruction 2
  POS 4: call go()
  POS 10: call hey()
}

Function go() {
  POS 5: instruction 3
  POS 6: instruction 4
  POS 7: instruction 5
}

Function hey() {
  POS 11: instruction 6
  POS 12: instruction 7
}

Function baz() {
  POS 14: instruction 8
  POS 15: instruction 9
}

FIG. 2a

```
Function foo (){
    POS3.1: instruction 2
    POS4.1: call go()
    POS11.10.1: instruction 6
    POS12.10.1: instruction 7
    POS 2: instruction 1
    POS14.13: instruction 8
    POS15.13: instruction 9
    POS 16: call hey()
}

Function bar() {
    POS 3: instruction 2
    POS 4: call go()
    POS 10: call hey()
}

Function go(){
    POS 5: instruction 3
    POS 6: instruction 4
    POS 7: instruction 5
}

Function hey(){
    POS 11: instruction 6
    POS 12: instruction 7
}

Function baz(){
    POS 14: instruction 8
    POS 15: instruction 9
}
```

FIG. 4

USING AN INLINE STACK TO IMPROVE PERFORMANCE OF AN APPLICATIONS BINARY

BACKGROUND

Feedback-directed optimization (FDO) is a technique used to tune application executions based on application runtime behavior in order to improve performance. FDO is also known as Profile Guided Optimization (PGO) and Profile Based Optimization (PBO). In order to tune applications, FDO conducts profiling on the applications. Profiling is the process of gathering information about how an application behaves during runtime. This profile information is used to drive decisions regarding various application optimizations.

As illustrated in FIG. 1, customary feedback-directed optimization is a dual build model technique that uses static instrumentation to collect edge and value profiles. An instrumentation build (101) allows the compiler to insert code into an application's binary to create an instrumented version of the binary (102). This inserted code typically counts edges or collects value profiles. The instrumented binary (102) is run on a representative set of training data (104) in a training run (103). At the end of the training execution, all collected edge counts and value information is written and aggregated in a profile database or gcov data file (GCDA) (105). An optimization build (106) then occurs in which the compiler uses the generated profile to make optimization decisions such as inline decisions, instruction scheduling, basic block re-ordering, function splitting, and register allocation.

Some applications contain multiple function calls and nested function calls. These function calls may be profiled in order to understand how many times they are executed. Each call to function may result in several instructions being executed, including the function call itself and the function return, which may be costly. Function calls are also barriers blocking other compiler optimizations such as constant propagation, redundancy elimination, dead code elimination among other optimizations. In order to improve an application's performance, function calls should be optimized. One way to minimize function calls is to inline the function behavior into the callsite where the behavior is called.

When performing FDO, two issues to consider are: (1) how to represent the generated profile and map the profile back to the compiler and (2) how the compiler will use the generated profile. These two issues can affect the generated profile's performance. The profile should accurately reflect the application's actual runtime behavior. There should be an approach for creating profiles that accurately and completely represent an application's runtime behavior and improve the performance of the binaries.

SUMMARY

This specification describes technologies relating to application performance improvement in general, and specifically to methods and systems for using an inline stack to create a profile for an application and easily map the profile back to the compiler to improve the performance of the application's binary.

In general, one aspect of the subject matter described in this specification can be embodied in a system, method, and non-transitory computer-readable medium for improving the performance of an application's binary. An exemplary method includes: while executing a first application binary, collecting profile data about the application that includes a map from at least one inline stack to the inline stack's execution count, wherein an inline stack is a stack of source locations in which the top of the stack can be any location in a function and other levels of the stack should be the location of a callsite which is inlined by a compiler in the normal binary; creating a context summary map from the collected profile data which shows a summary of the total execution count of all instructions in the callee function for each callsite inlined in the application binary; using the context summary map to compare each function callsite's execution count with a predetermined threshold; annotating the profile; and generating a second application binary using the annotated profile.

An exemplary system includes: one or more processing devices and one or more storage devices storing instructions that, when executed by the one or more processing devices, cause the one or more processing devices to: while executing a first application binary, collect profile data about the application that includes a map from at least one inline stack to the inline stack's execution count, wherein an inline stack is a stack of source locations in which the top of the stack can be any location in a function and other levels of the stack should be the location of a callsite which is inlined by a compiler in the normal binary; create a context summary map from the collected profile data which shows a summary of the total execution count of all instructions in the callee function for each callsite inlined in the application binary; use the context summary map to compare each function callsite's execution count with a predetermined threshold; annotate the profile; and generate a second application binary using the annotated profile.

An exemplary non-transitory computer-readable medium may store computer executable code that causes one or more processors to execute the steps of: while executing a first application binary, collecting profile data about the application that includes a map from at least one inline stack to the inline stack's execution count, wherein an inline stack is a stack of source locations in which the top of the stack can be any location in a function and other levels of the stack should be the location of a callsite which is inlined by a compiler in the normal binary; creating a context summary map from the collected profile data which shows a summary of the total execution count of all instructions in the callee function for each callsite inlined in the application binary using the context summary map to compare each function callsite's execution count with a predetermined threshold; annotating the profile; and generating a second application binary using the annotated profile.

These and other embodiments can optionally include one or more of the following features: the context summary map may compare each function callsite's execution count with a predetermined threshold by generating a function callsite list for each function and for each callsite in the callsite list, determining whether the function callsite execution count is greater than or equal to the threshold, responsive to determining that the function callsite execution count is greater than or equal to the threshold, the callsite's callee function may be inlined into the current function and the callee's callsites may be added to the current function's callsite list; annotating the profile may include traversing the content of each function and for each instruction in the content, determining whether there is an inline stack associated with the instruction, responsive to determining that there is not an inline stack associated with the instruction, setting the instruction's execution count in the profile to 0; inlining the callsite's callee function may include cloning the callee function into the caller function; and the threshold may be heuristically determined.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 2a is an example application binary.

FIG. 2b is an example application profile.

FIG. 2c is an example context summary map.

FIG. 4 is an example of optimized application binary.

DETAILED DESCRIPTION

Figure 1:
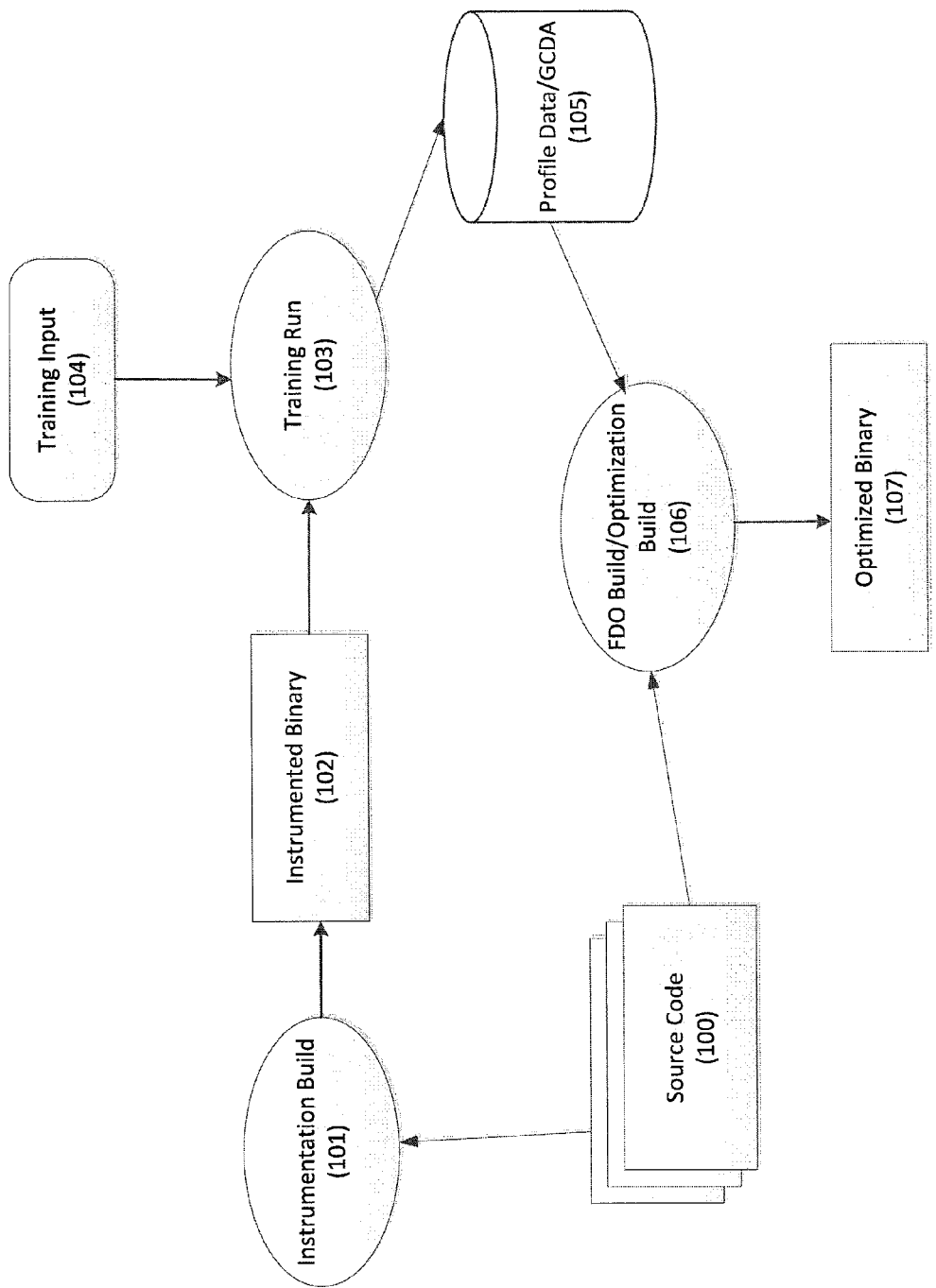
FIG. 1 is a block diagram illustrating a block diagram illustrating a conventional feedback-directed optimization loop.

According to an example embodiment, the performance of an application's normal binary can be improved by creating an accurate and complete profile for the binary. Normal binary is built with normal optimization configurations usually at level 2 optimization without profile feedback. An optimized binary, a binary optimized using an exemplary profile feedback technique, may be generated for an application's normal binary by using inline functions to represent frequently-executed function callsites for the application's normal binary and adding annotations to the instructions to distinguish between heavily-executed instructions and other instructions.

In an example embodiment, profile data may be collected by sampling a normally optimized application binary. A profile may be generated that includes the instruction calls in a particular application. This profile may show the frequencies of instructions and the inline stack involved in the instructions per caller's callsite. An inline stack is a stack of source locations in which the top of the stack can be any location in a function and other levels of the stack should be the location of a callsite which is inlined by a compiler in the normal binary. For example, as illustrated in FIG. 2a, a given application may contain a function "foo" which calls a function named "bar" at position 1 (POS 1). Since function "foo" calls function "bar," function "foo" is a caller function of "bar" and the call site, POS 1, is where the actual call to function "bar" inside of function "foo" exists.

Function "foo" may call function "bar" multiple times in a given execution of the application. Each call to function "bar" may result in several instructions being executed, including the function call itself and the function return, which may be costly.

While profiling the application, the number of times that function "foo" calls function "bar" may be recorded. The profile may be represented as a key-value pair in which the inline stack is the key and the number of times the particular inline stack is executed in a given application run is the value. This step collects profile data on an application's normal binary. Normal binary may have some generic function inlining in order to have profile data keyed by the inline stack.

For example, FIG. 2b represents an example generated profile for the application illustrated in FIG. 2a. As illustrated, instruction 2 inside of function "bar" from the application shown in FIG. 2a may be executed 10 times. Instruction 1 inside of function "foo" may be executed 73 times.

Figure 3:
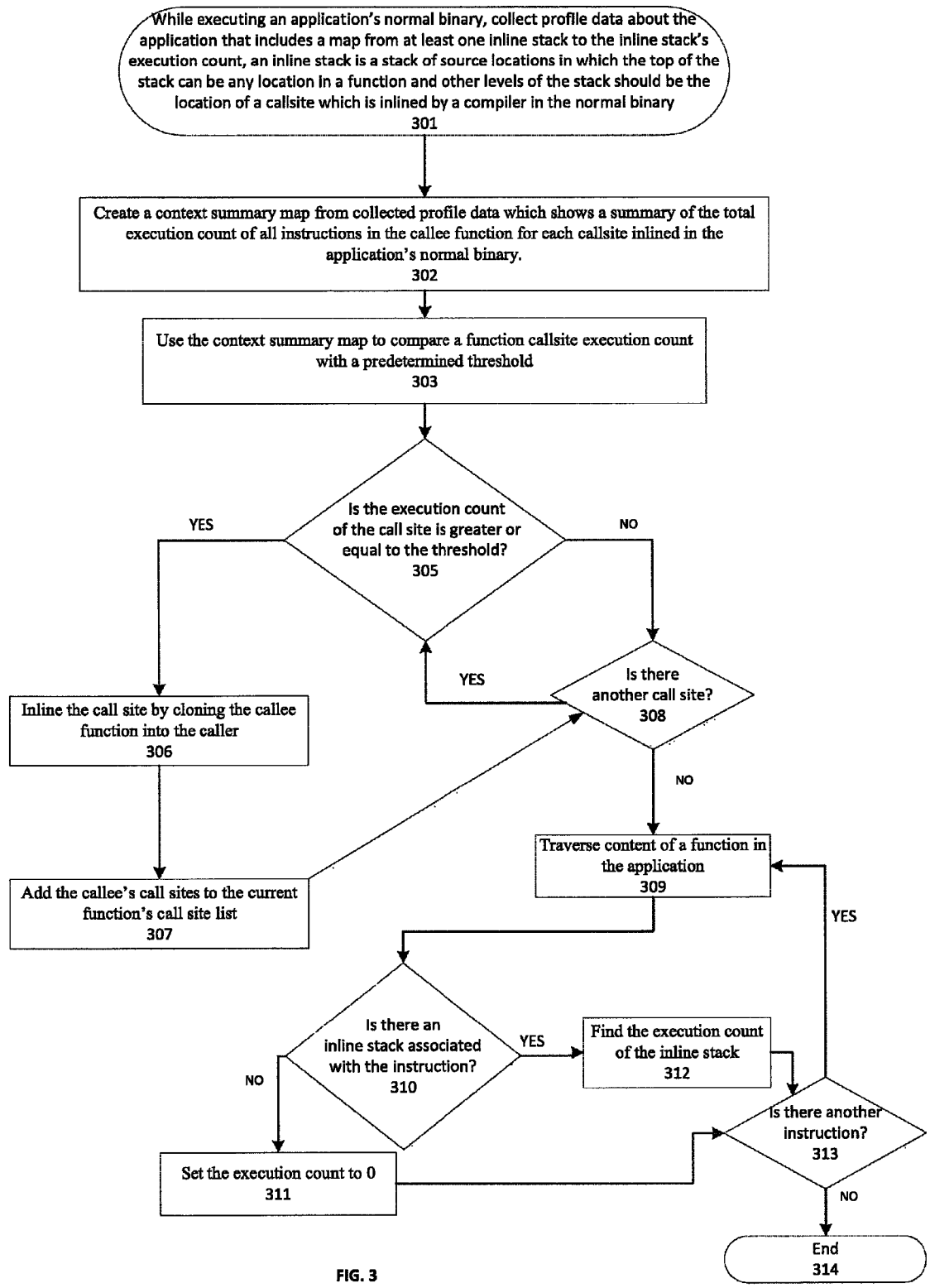
FIG. 3 is a flow diagram of an example method for using inline stacks to improve performance of an application's binary.

An example method for improving the performance of an application by producing optimized binary begins with collecting profile data about an application that includes which callee function's instructions are called from the application's callsites and the number of times each instruction is called as illustrated in FIG. 3 (301). A context summary map may then be built from collected profile data from an application's normal binary. This context summary map may be a map from a particular callsite to the total number of executions of the callsite during a run of the application. The context summary map may show a summary of the total execution count of all instructions in the callee function for each callsite inlined in the application's normal binary (302).

For example, FIG. 2c may be a context summary for the profile of FIG. 2b representing the application illustrated in FIG. 2a. As shown, POS 1, representing the callsite in function "foo" to function "bar," may be executed by function "foo" a total of 264 times. Inside of "bar," the callsite to function "hey" may be executed 250 times.

For each function in the application, an example method may use an iterative approach to review all callsites of the function in the context summary map. The execution count of each callsite may be compared with a particular threshold that may be determined by a heuristic as illustrated in FIG. 3 (303). An example heuristic may be 1/10,000 of a maximum count where maximum count is the maximum execution count of all blocks in a particular application's binary. If the number of times that the function callsite is executed is greater than (or equal to) the threshold, the call site may be considered "hot" and may be inlined into the current function (306). Inlining is the process of replacing a function callsite with the body of the callee. After a callsite is inlined, the callee's callsites may be added to the current function's callsite list so that, in the next iteration, these new function callsites may be processed as described above by comparing the execution count of the call site with a threshold and determining whether to inline the call site. (307, 308) Iteration may terminate when no more callsites are inlined.

For example, an example method may use a threshold of 100 execution times for a function callsite to be considered "hot." Using the application illustrated in FIG. 2a and FIG. 2a's context summary map as illustrated in FIG. 2c, an example method may do top-down inline transformations by checking all callsites of a first function. In this case, function "foo" has two callsites, one for calling function "bar" at POS 1 and one for calling function "baz" at POS 13. The execution count for calling function "bar" is 264 according to FIG. 2c. This execution count may be compared against the threshold number which is 100 in this example. 264 is greater than 100. Therefore the callsite for function "bar" inside function "foo" may be considered hot and the callsite may be inlined, meaning that the contents of the callee function, function "bar," are cloned into the caller function, function "foo." The callee's callsites may also be added to the caller function's callsite list. In this case, instruction 2 and the callsites for calling functions "go" and "hey" may be cloned into function "foo." Callsites for calling functions "go" and "hey" may also be added to function foo's callsite list. In a second iteration, execution times for the callsites for functions "go" and "hey" may be compared with the threshold number 100. As illustrated in FIG. 2c, the callsite to function "go" may be executed 4 times and the callsite to function "hey" may be executed 250 times. Function "go" may not be inlined into function "foo" because 4 is less than the 100 execution count threshold. Function "hey" may be inlined into function "foo" since 250 is greater than 100. Since function "hey" has no callsites, there are no additional callsites to add to function foo's callsite list. An example method may then look at function foo's callsite for calling function "baz."

According to FIG. 2c, the execution count for calling function "baz" is 170. This execution count may be compared against the threshold number, 100. 170 is greater than 100 so the callsite for function "baz" may be considered hot and the callsite may be inlined into function "foo." Since function "baz" has no callsites and function foo has no additional callsites, the iterative process may then terminate. FIG. 4 illustrates the optimized binary that results from this inline optimization.

After all iterations for the application, all "hot" functions in the application may have been cloned by the compiler. Each clone may have its own corresponding profile context. For example, in the example above, the function "bar" now has two copies in the optimized binary of FIG. 4, the original function and the "bar" function cloned in foo. Each copy will have its own profile in the form key-value pair of <inline stack, count>. In this example, POS3's count is 0 while POS3.1's count is 10.

The compiler may then traverse all of the content in each function of the application as illustrated in FIG. 3 (309). For each instruction, an example method determines whether there is an inline stack associated with the instruction (310). If an inline stack exists, the inline stack may be used to find the function's execution count. For all "hot" functions, there should already be a proper clone and the corresponding inline stack should always find a match in the profile. If the inline stack cannot be found in the profile, the instruction should be considered "cold" and the instruction execution count may be annotated as 0 (311). After annotation, all hot instructions are identified. Based on this identification, many compiler optimizations can make better decisions. For example, code reordering can put hot instructions together to make the code more efficient.

Figure 5:
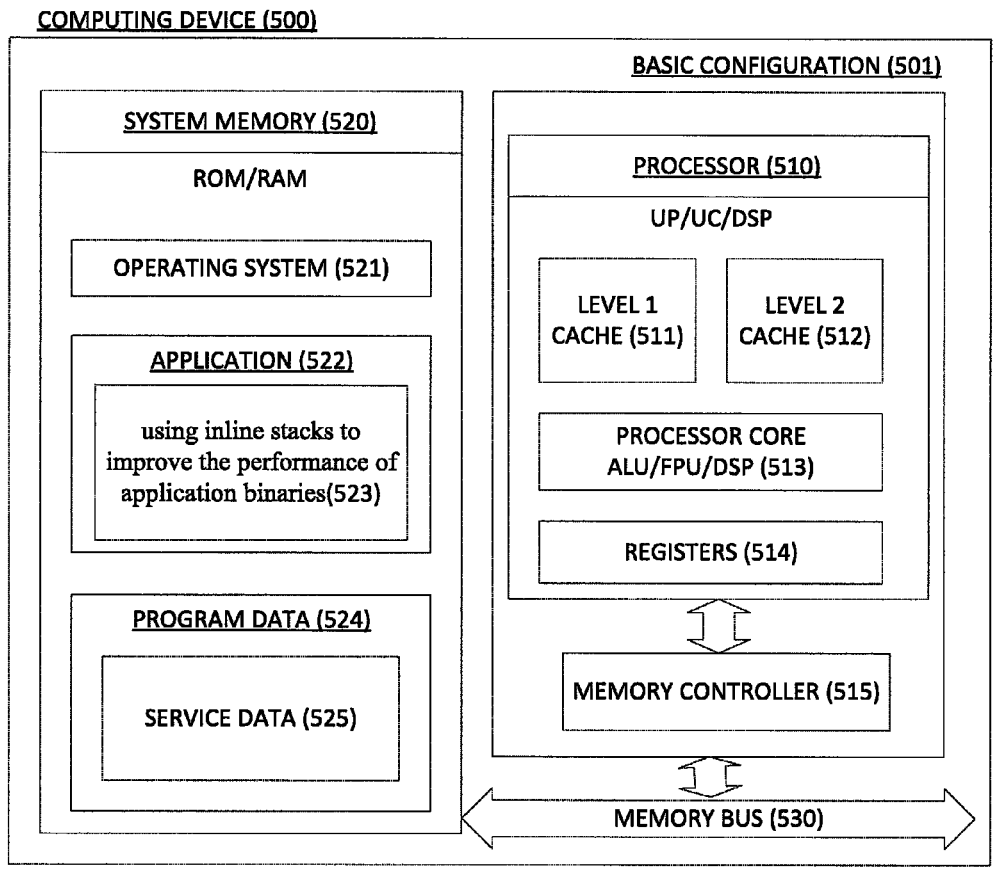
FIG. 5 is a block diagram illustrating an exemplary computing device.

FIG. 5 is a high-level block diagram of an example computer (500) that is arranged for using inline stacks to improve the performance of application binaries. In a very basic configuration (501), the computing device (500) typically includes one or more processors (510) and system memory (520). A memory bus (530) can be used for communicating between the processor (510) and the system memory (520).

Depending on the desired configuration, the processor (510) can be of any type including but not limited to a microprocessor (µP), a microcontroller (µC), a digital signal processor (DSP), or any combination thereof. The processor (510) can include one more levels of caching, such as a level one cache (511) and a level two cache (512), a processor core (513), and registers (514). The processor core (513) can include an arithmetic logic unit (ALU), a floating point unit (FPU), a digital signal processing core (DSP Core), or any combination thereof. A memory controller (516) can also be used with the processor (510), or in some implementations the memory controller (515) can be an internal part of the processor (510).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a method for using inline stacks to improve the performance of application binaries. Program Data (524) includes storing instructions that, when executed by the one or more processing devices, implement a method for application binary optimizations. (523). In some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (500) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for improving the performance of an application's binary, the method comprising:
    while executing a first application binary, collecting profile data about the application that includes a map from at least one inline stack to the inline stack's execution count, wherein an inline stack is a stack of source locations in which the top of the stack is located in a function and at least one other level of the stack is the location of a callsite which is inlined by a compiler in the normal binary;
    creating a context summary map from the collected profile data which shows a summary of the total execution count of all instructions in the callee function for each callsite inlined in the application binary;
    using the context summary map to compare each function callsite's execution count with a predetermined threshold;
    annotating the profile by:
        traversing the content of each function,
        for each instruction in the content, determining whether there is an inline stack associated with the instruction, and
        responsive to determining that there is not an inline stack associated with the instruction, setting the instruction's execution count in the profile to 0; and
    generating a second application binary using the annotated profile.

2. The method of claim 1, wherein using the context summary map to compare each function callsite's execution count with a predetermined threshold further comprises:
    for each function, generating a function callsite list;
        for each callsite in the callsite list, determining whether the function callsite execution count is greater than or equal to the threshold;
    responsive to determining that the function callsite execution count is greater than or equal to the threshold,
        inlining the callsite's callee function into the current function and
        adding the callee's callsites to the current function's callsite list.

3. The method of claim 2, wherein inlining the callsite's callee function further comprises:
    cloning the callee function into the caller function.

4. The method of claim 1, wherein the threshold is heuristically determined.

5. A system for improving the performance of an application's binary, the system comprising:
    one or more processing devices; and
    one or more storage devices storing instructions that, when executed by the one or more processing devices, cause the one or more processing devices to:
        while executing a first application binary, collect profile data about the application that includes a map from at least one inline stack to the inline stack's execution count, wherein an inline stack is a stack of source locations in which the top of the stack is located in a function and at least one other level of the stack is the location of a callsite which is inlined by a compiler in the normal binary;
    create a context summary map from the collected profile data which shows a summary of the total execution count of all instructions in the callee function for each callsite inlined in the application binary;
    use the context summary map to compare each function callsite's execution count with a predetermined threshold;
    annotate the profile by:
        traversing the content of each function,
        for each instruction in the content, determining whether there is an inline stack associated with the instruction, and
        responsive to determining that there is not an inline stack associated with the instruction, setting the instruction's execution count in the profile to 0; and
    generate a second application binary using the annotated profile.

6. The method of claim 5, wherein using the context summary map to compare each function callsite's execution count with a predetermined threshold further comprises:
    for each function, generating a function callsite list;
        for each callsite in the callsite list, determining whether the function callsite execution count is greater than or equal to the threshold;
    responsive to determining that the function execution count is greater than or equal to the threshold,
    inlining the callsite's callee function into the current function and adding the callee's callsites to the current function's callsite list.

7. The system of claim 5, wherein inlining the callsite's callee function further comprises:
    cloning the callee function into the caller function.

8. The system of claim 5, wherein the threshold is heuristically determined.

9. A non-transitory computer-readable medium having stored therein computer executable code that causes one or more processors to execute the steps of:
    while executing a first application binary, collecting profile data about the application that includes a map from at least one inline stack to the inline stack's execution count, wherein an inline stack is a stack of source locations in which the top of the stack is located in a function and at least one other level of the stack is the location of a callsite which is inlined by a compiler in the normal binary;
    creating a context summary map from the collected profile data which shows a summary of the total execution count of all instructions in the callee function for each callsite inlined in the application binary;
    using the context summary map to compare each function callsite's execution count with a predetermined threshold;
    annotating the profile by:
        traversing the content of each function,
        for each instruction, determining whether there is an inline stack associated with the instruction, and
        responsive to determining that there is not an inline stack associated with the instruction, setting the instruction's execution count in the profile to 0; and
    generating a second application binary using the annotated profile.

10. The non-transitory computer-readable medium of claim 9, wherein using the context summary map to compare each function callsite's execution count with a predetermined threshold further comprises:
    for each function, generating a function callsite list;
        for each callsite in the callsite list, determining whether the function callsite execution count is greater than or equal to the threshold;
    responsive to determining that the function callsite:
        execution count is greater than or equal to the threshold, inlining the callsite's callee function into the current function and
        adding the callee's callsites to the current function's callsite list.

11. The non-transitory computer-readable medium of claim 9, wherein inlining the callsite's callee function further comprises:
    cloning the callee function into the caller function.

12. The non-transitory computer-readable medium of claim 9, wherein the threshold is heuristically determined.

\* \* \* \* \*